July 19, 1927.

A. WURDACK

FRUIT PRESS

Filed July 1, 1925

WITNESS:

Charles A. Becker

INVENTOR.

ARTHUR WURDACK,

BY Pepper Kingsland

HIS ATTORNEYS.

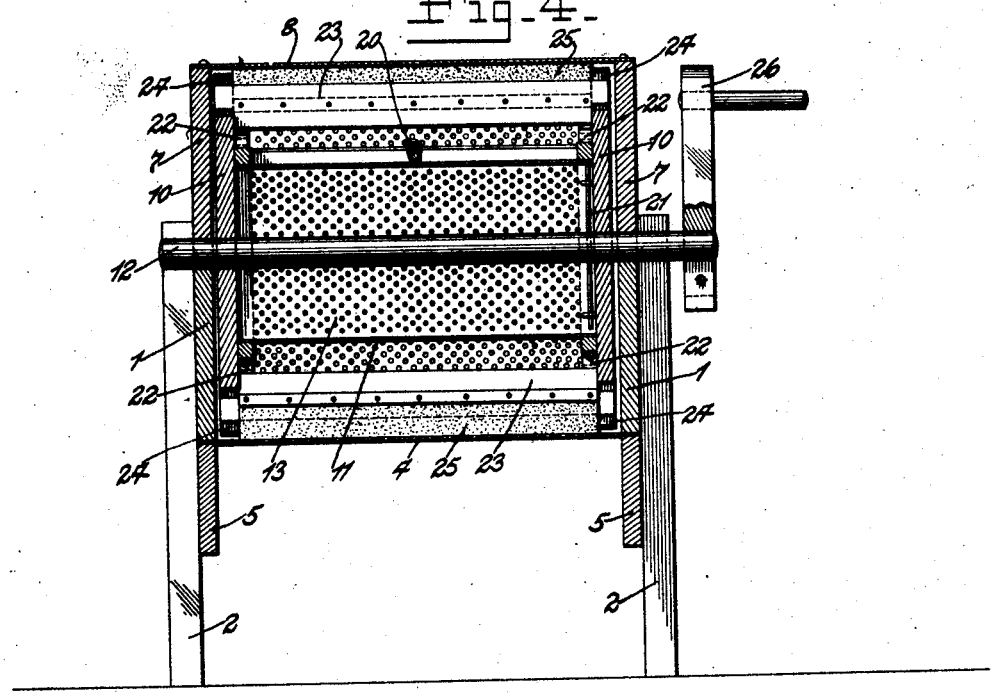
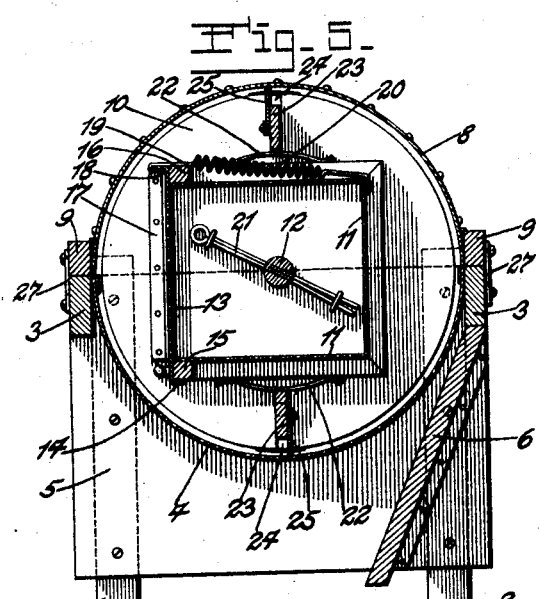

Patented July 19, 1927.

1,636,204

UNITED STATES PATENT OFFICE.

ARTHUR WURDACK, OF NORMANDY, MISSOURI.

FRUIT PRESS.

Application filed July 1, 1925. Serial No. 40,812.

This invention relates to fruit presses.

An object of the invention is to provide a new machine comprising a receptacle having a bottom wall provided with numerous holes for the passage of the fruit juices, in combination with a rotary chamber within the receptacle arranged to contain crushed fruits and having perforated side walls through which the fruit juices are caused to pass during the rotation of said chamber.

Another object of the invention is to provide a machine embodying the structure mentioned and having yieldable wipers supported by the rotary chamber which contact with the perforated bottom wall of the receptacle, causing the fruit juices to pass therethrough.

Another object of the invention is to provide a machine comprising a rotary chamber having a detachable, perforated side wall which may be removed conveniently to permit the fruits to be placed in and the remnants to be removed from said chamber.

Another object of the invention is to provide a machine of the type mentioned in which a number of wipers are yieldingly supported by the rotary chamber to agitate the substances passing into the enclosing receptacle to expedite the passage of juices therefrom.

Other objects will appear from the following description, reference being made to the accompanying drawings, in which Fig. 1 is a plan view of my machine.

Fig. 4 is a longitudinal sectional view on the line 4—4 of Fig. 1.

Fig. 5 is a cross sectional view on the line 5—5 of Fig. 2.

Figure 1:
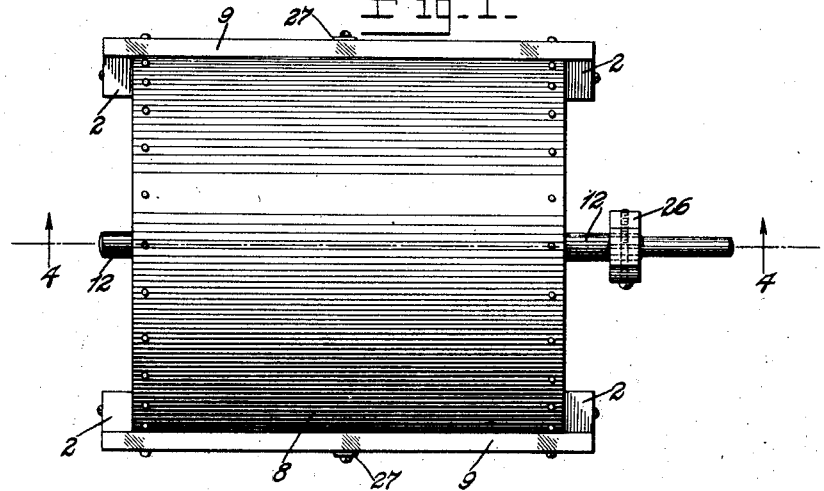
Figure 2:
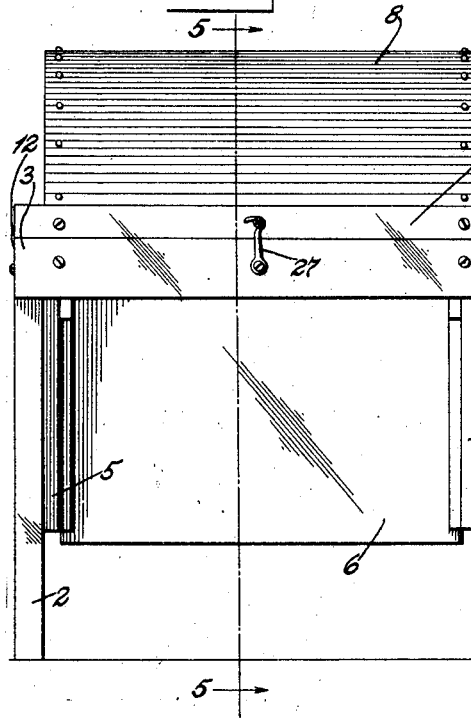
Fig. 2 is a side elevation.
Figure 3:
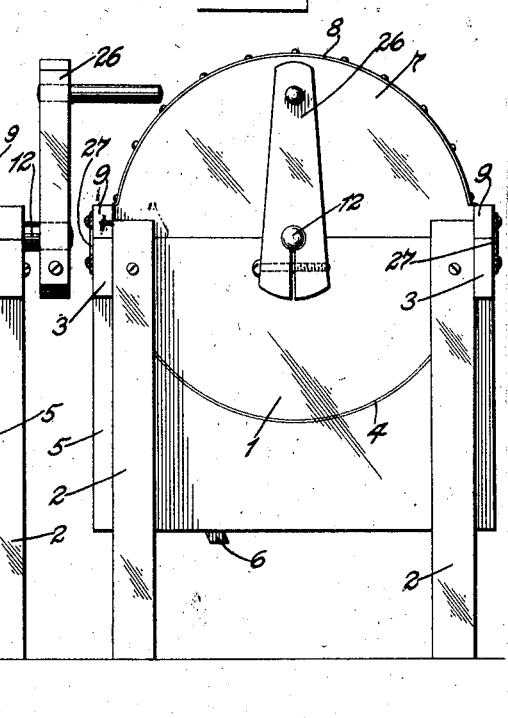
Fig. 3 is an end elevation.

The enclosing receptacle comprises a pair of lower end walls 1 supported by the machine legs 2 and rigidly connected by longitudinal side members 3. A lower wall 4 semi-circular in cross section has its ends attached to the end walls 1 and its upwardly extending side edges attached to the side members 3.

Lower end wall portions 5 extend downwardly below the bottom wall 4. An inclined apron 6 extends obliquely inwardly and downwardly from one of the side members 3 between the lower end walls 5. The bottom wall 4 is provided with numerous perforations to permit free passage of the fruit juices from the machine.

The upper portion of the receptacle comprises a pair of end walls 7 and a semi-circular top wall 8 which is preferably imperforate to prevent passage of the fruit juices therethrough. Side members 9 are attached to the edges of the top wall 8 and have their ends attached to the end walls 7, and when the machine is assembled the side members 9 rest upon the lower side members 3, while the end walls 7 rest upon the upper edges of the end walls 1, and the lower edges of the top wall 8 contact with the upper edges of the bottom wall 4.

A polygonal chamber comprising end walls 10 and perforated walls 11 is attached to a shaft 12 journaled for rotation in bearings formed in the adjacent portions of the respective end walls 1 and 7. One side of the chamber is provided with a removable wall 13 having a flange 14 on one edge arranged to engage against a longitudinal frame member 15 in connection with the side edge of one of the walls 11.

The opposite edge of the wall 13 bears against a frame member 16 attached to the side edge of the opposite wall 11, said wall 13 being retained against said frame members by strips 17 attached to the end walls 10. A flange 18 on the edge of the wall 13 opposite from the flange 14 is engaged by a hook 19 on one end of a spring 20, the opposite end of which is connected to one of the walls 11. Thus the wall 13 is retained in place but may be removed by detaching the hook 19. The chamber thus constructed is attached to the shaft 12 by a removable fastener 21, removal of which permits the chamber to be moved longitudinally from the shaft.

The two end walls 10 of the chamber support outwardly bowed leaf springs 22. A pair of slides 23 have their ends guided in slots 24 in the end walls 10 and their inner edges bearing against the springs 22. Elastic rubbers 25 have their inner edges attached to the slides 23 and their outer edges designed and arranged to rub against the walls 4 and 8 of the machine to stir or agitate the fruit substances that pass from the rotary receptacle and thereby cause the juices to pass through the holes in the wall 4.

One end of the shaft 12 is provided with a crank 26 by which said shaft and thereby the rotary receptacle may be rotated.

As seen in Fig. 5 the rotating receptacle is rotated in a counterclockwise direction maintaining the crushed fruit therein in agitation and causing the juices to pass therefrom to the perforated bottom wall 4 of the machine. The apron 6 prevents lateral splashing of the fruit juices which may be caught in any appropriate receptacle placed below the machine for that purpose. The elastic rubbers 25 will free most of the juices of the fruit without forcing any material quantity of the fruit fibers through the wall 4.

Releasable fasteners 27 hold the removable top of the machine upon the lower portion and, by preventing vertical displacement of the removable top, cooperate with the shaft 12 to prevent lateral displacement of said top.

From the foregoing it will be seen that the machine is an efficient one for the purpose for which it is intended, and is easily assembled and operated. The structure of the machine may be varied within equivalent limits without departure from the nature and principle of the invention.

I claim:

1. A machine of the character described comprising an enclosing receptacle, a rotary shaft extending longitudinally through the receptacle having a perforated side wall portion, a chamber attached to said shaft and arranged to contain the material from which juices are to be removed and having perforated side walls, a rubber in said receptacle and rotated with said chamber for agitating the materials passing from said chamber into said receptacle and arranged to scrape over said perforated wall portion, and springs pressing said rubbers toward the wall of said receptacle.

2. A machine of the character described comprising a tubular receptacle having a perforated side wall portion, a chamber rotative in said receptacle, means for rotating said chamber, rubbers in said receptacle between said chamber and the wall of said receptacle and arranged to scrape over said perforated wall portion, means for rotating said rubbers with said chamber, and springs actuating said rubbers toward the wall of said receptacle.

3. A machine of the character described comprising a receptacle having a perforated side wall portion, a chamber rotative in said receptacle having a removable side wall and having its walls perforated, means for holding said removable side wall in proper relationship to the remaining walls of said chamber, a rubber mounted between said chamber and the wall of said receptacle and arranged to scrape over said perforated wall portion, means for rotating said rubber with said chamber, and means for pressing said rubber into contact with the walls of said receptacle.

4. A machine of the character described comprising a receptacle having a semi-tubular perforated wall portion at its lower side, a chamber rotative in said receptacle, means for rotating said chamber, an element in said receptacle between said chamber and the wall of said receptacle and arranged to scrape over said perforated wall portion, connections for rotating said element with said chamber, and springs actuating said elements toward the wall of said receptacle.

5. A machine of the character described comprising a receptacle having a perforated lower side wall portion, a chamber rotative in said receptacle and provided with a perforated wall, means for rotating said chamber, a rotary element in said receptacle between said chamber and said receptacle and arranged to scrape over said perforated wall portion, connections for rotating said rotary element with said chamber, and springs actuating said rotary element toward the wall of said receptacle.

ARTHUR WURDACK.